(12) United States Patent
Drivdahl et al.

(10) Patent No.: US 9,540,883 B2
(45) Date of Patent: *Jan. 10, 2017

(54) FIBER-CONTAINING DIAMOND-IMPREGNATED CUTTING TOOLS AND METHODS OF FORMING AND USING SAME

(71) Applicant: Longyear TM, Inc., South Jordan, UT (US)

(72) Inventors: Kristian S. Drivdahl, Park City, GA (US); Michael D. Rupp, Murray, UT (US); Christian M. Lambert, Draper, UT (US); Cody A. Pearce, Midvale, UT (US)

(73) Assignee: LONGYEAR TM, INC., Salt Lake City, UT (US)

( * ) Notice: Subject to any disclaimer, the term of this patent is extended or adjusted under 35 U.S.C. 154(b) by 289 days.

This patent is subject to a terminal disclaimer.

(21) Appl. No.: 14/229,387

(22) Filed: Mar. 28, 2014

(65) Prior Publication Data

US 2014/0231149 A1    Aug. 21, 2014

Related U.S. Application Data

(60) Continuation-in-part of application No. 13/477,989, filed on May 22, 2012, now Pat. No. 8,783,384, which
(Continued)

(51) Int. Cl.
*C22C 49/14* (2006.01)
*E21B 10/48* (2006.01)
(Continued)

(52) U.S. Cl.
CPC ............. *E21B 10/48* (2013.01); *B32B 15/011* (2013.01); *C22C 26/00* (2013.01); *C22C 38/00* (2013.01);
(Continued)

(58) Field of Classification Search
CPC ..................................................... C22C 49/14
See application file for complete search history.

(56) References Cited

U.S. PATENT DOCUMENTS 1,041,568 A    10/1912  Bade
1,939,991 A    12/1933  Krusell
(Continued)

FOREIGN PATENT DOCUMENTS

AU    2007342231 A1    7/2008
AU    2011226849 A1    10/2011
(Continued)

OTHER PUBLICATIONS

Requirement for Restriction/Election issued on Sep. 9, 2008 for U.S. Appl. No. 11/948,185, filed Nov. 30, 2007 (Inventor—Drivdahl; Applicant—Boart Longyear (8 pages).
(Continued)

*Primary Examiner* — George Wyszomierski
*Assistant Examiner* — Ngoclan T Mai
(74) *Attorney, Agent, or Firm* — Ballard Spahr LLP

(57) ABSTRACT

Fibers for diamond-impregnated cutting tools and their associated methods for manufacture and use are described. A matrix is formed that contains fibers made from carbon, glass, ceramic, polymer, and the like. The matrix is then sintered to form a cutting portion of a drill bit. The type and concentration of the fibers can be modified to control the tensile strength and the erosion rate of the matrix to optimize the cutting performance of the tools. Additionally, the fibers may be added to the cutting section to weaken the structure and allow higher modulus binders to be used for the cutting tools at a lower cost, allowing the amount of fibers to be tailored to retain the diamonds in the cutting portion for the desired amount. As the cutting portion erodes, the fibers may also increase the lubricity at the face of the cutting portion.

20 Claims, 3 Drawing Sheets

Related U.S. Application Data is a continuation of application No. 12/276,903, filed on Nov. 24, 2008, now Pat. No. 8,191,445, which is a division of application No. 11/948,185, filed on Nov. 30, 2007, now Pat. No. 7,695,542.

(60) Provisional application No. 60/917,016, filed on May 9, 2007, provisional application No. 60/867,882, filed on Nov. 30, 2006.

(51) Int. Cl.
  *C22C 26/00* (2006.01)
  *C22C 47/04* (2006.01)
  *C22C 49/02* (2006.01)
  *C22C 49/08* (2006.01)
  *C22C 49/10* (2006.01)
  *B32B 15/01* (2006.01)
  *C22C 38/00* (2006.01)
  *B22F 7/06* (2006.01)
  *B22F 5/00* (2006.01)

(52) U.S. Cl.
  CPC ............... *C22C 47/04* (2013.01); *C22C 49/02* (2013.01); *C22C 49/08* (2013.01); *C22C 49/10* (2013.01); *C22C 49/14* (2013.01); *B22F 2005/001* (2013.01); *B22F 2007/066* (2013.01)

(56) References Cited

U.S. PATENT DOCUMENTS

| | | | |
|---|---|---|---|
| 2,147,843 A | 2/1939 | Jamar et al. | |
| 2,326,908 A | 8/1943 | Williams, Jr. | |
| 2,371,488 A | 3/1945 | Williams, Jr. | |
| 2,495,400 A | 1/1950 | Williams, Jr. | |
| 2,552,485 A | 5/1951 | Howard et al. | |
| 2,811,960 A | 11/1957 | Fessel | |
| 3,215,215 A | 11/1965 | Kellner | |
| 3,537,538 A | 11/1970 | Generoux | |
| 3,972,161 A | 8/1976 | Zoiss | |
| 4,128,136 A | 12/1978 | Generoux | |
| 4,186,628 A | 2/1980 | Bonnice | |
| 4,189,015 A | 2/1980 | Acker, III et al. | |
| 4,190,126 A | 2/1980 | Kabashima | |
| 4,208,154 A | 6/1980 | Gundy | |
| 4,211,294 A | 7/1980 | Multakh | |
| 4,452,325 A | 6/1984 | Radd et al. | |
| 4,499,959 A | 2/1985 | Grappendorf et al. | |
| 4,534,773 A | 8/1985 | Phaal et al. | |
| 4,595,623 A | 6/1986 | Du Pont et al. | |
| 4,613,287 A | 9/1986 | Hambley | |
| 4,681,174 A | 7/1987 | Aubakirov et al. | |
| 4,698,010 A | 10/1987 | Toncelli | |
| 4,863,490 A | 9/1989 | Buljan et al. | |
| 5,025,871 A | 6/1991 | Stewart et al. | |
| 5,052,153 A | 10/1991 | Wiand | |
| 5,069,584 A | 12/1991 | Obermeier et al. | |
| 5,092,910 A | 3/1992 | deKok et al. | |
| 5,218,888 A | 6/1993 | Merrill | |
| 5,435,815 A | 7/1995 | Ikegaya et al. | |
| 5,451,352 A | 9/1995 | Cook | |
| 5,536,485 A | 7/1996 | Kume et al. | |
| 5,644,956 A | 7/1997 | Blackman et al. | |
| 5,677,372 A | 10/1997 | Yamamoto et al. | |
| 5,901,964 A | 5/1999 | Williams et al. | |
| 5,932,508 A | 8/1999 | Armstrong et al. | |
| 5,996,571 A | 12/1999 | Jedick | |
| 6,063,332 A | 5/2000 | Imamura et al. | |
| 6,084,052 A | 7/2000 | Aufdermarsh et al. | |
| 6,273,924 B1 | 8/2001 | Krenkel et al. | |
| 6,390,890 B1 | 5/2002 | Molnar | |
| 6,394,192 B1 | 5/2002 | Frazer | |
| 6,399,737 B1 | 6/2002 | Elkovitch | |
| 6,413,287 B1 | 7/2002 | Barber, Jr. | |
| D466,139 S | 11/2002 | Kim et al. | |
| 6,607,835 B2 | 8/2003 | Fang et al. | |
| 6,997,977 B2 | 2/2006 | Dallas et al. | |
| 7,141,086 B2 | 11/2006 | Endoh et al. | |
| 7,243,745 B2 | 7/2007 | Skeem et al. | |
| 7,641,004 B2 | 1/2010 | Lapointe | |
| 7,695,542 B2 | 4/2010 | Drivdahl et al. | |
| 7,802,495 B2 | 9/2010 | Oxford et al. | |
| 8,146,686 B2 | 4/2012 | Drivdahl et al. | |
| 8,191,445 B2 | 6/2012 | Drivdahl et al. | |
| 8,783,384 B2 | 7/2014 | Drivdahl et al. | |
| 2002/0020564 A1 | 2/2002 | Fang et al. | |
| 2003/0162648 A1 | 8/2003 | Middlemiss | |
| 2004/0231245 A1 | 11/2004 | Yamamoto et al. | |
| 2005/0115743 A1 | 6/2005 | Griffo | |
| 2005/0189647 A1 | 9/2005 | Sung | |
| 2005/0247491 A1 | 11/2005 | Mirchandani et al. | |
| 2006/0243494 A1 | 11/2006 | Koltermann et al. | |
| 2007/0051455 A1 | 3/2007 | Franchet et al. | |
| 2007/0131456 A1 | 6/2007 | Lapointe | |
| 2008/0066969 A1 | 3/2008 | Paul-Philippe | |
| 2008/0209818 A1 | 9/2008 | Belnap et al. | |
| 2011/0067924 A1 | 3/2011 | Lambert et al. | |
| 2014/0013675 A1 | 1/2014 | Tian et al. | |
| 2014/0311809 A1 | 10/2014 | Drivdahl et al. | |

FOREIGN PATENT DOCUMENTS

| | | | |
|---|---|---|---|
| AU | 2011226850 A1 | 10/2011 | |
| AU | 2012211429 A1 | 8/2012 | |
| AU | 2012211431 A1 | 8/2012 | |
| CA | 2671193 A1 | 7/2008 | |
| CN | 2521373 Y | 11/2002 | |
| EP | 2055890 A1 | 5/2009 | |
| EP | 2092155 | 8/2009 | |
| JP | H03243735 A | 10/1991 | |
| JP | 2003-243735 A | 8/2003 | |
| JP | 2004-358580 A | 12/2004 | |
| JP | 2006-255822 A | 9/2006 | |
| WO | WO-2006076795 A1 | 7/2006 | |
| WO | WO-2015/148910 | 10/2015 | |

OTHER PUBLICATIONS

Response to Restriction Requirement filed with the USPTO on Oct. 8, 2008 for U.S. Appl. No. 11/948,185, filed Nov. 30, 2007 (Inventor—Drivdahl; Applicant—Boart Longyear) (2pages).

Non-Final Rejection issued on Jan. 26, 2009 for U.S. Appl. No. 11/948,185, filed Nov. 30, 2007 (Inventor—Drivdahl; Applicant—Boart Longyear) (6 pages).

Amendment and Response to Office Action filed with the USPTO on Apr. 23, 2009 for U.S. Appl. No. 11/948,185, filed Nov. 30, 2007 (Inventor—Drivdahl; Applicant—Boart Longyear) (12pages).

Ex Parte Quayle Action issued on Aug. 18, 2009 for U.S. Appl. No. 11/948,185, filed Nov. 30, 2007 (Inventor—Drivdahl; Applicant—Boart Longyear) (7 pages).

Response to Ex Parte Quayle Action and Amendment filed with the USPTO on Sep. 17, 2009 for U.S. Appl. No. 11/948,185, filed Nov. 30, 2007 (Inventor—Drivdahl; Applicant—Boart Longyear) (6 pages).

Request for Continued Examination filed with the USPTO on Sep. 17, 2009 for U.S. Appl. No. 11/948,185, filed Nov. 30, 2007 (Inventor—Drivdahl; Applicant—Boart Longyear) (3 pages).

Non-Final Rejection issued on Oct. 5, 2009 for U.S. Appl. No. 11/948,185, filed Nov. 30, 2007 (Inventor—Drivdahl; Applicant—Boart Longyear) (6 pages).

Amendment and Response to Non-Final Office Action filed on Oct. 7, 2009 for U.S. Appl. No. 11/948,185, filed Nov. 30, 2007 (Inventor—Drivdahl; Applicant—Boart Longyear) (14 pages).

Notice of Allowance issued on Feb. 12, 2010 for U.S. Appl. No. 11/948,185, filed Nov. 30, 2007 (Inventor—Drivdahl; Applicant—Boart Longyear) (4 pages).

Issue Notification issued on Mar. 24, 2010 for U.S. Appl. No. 11/948,185, filed Nov. 30, 2007 (Inventor—Drivdahl; Applicant—Boart Longyear) (1 page).

(56) References Cited

OTHER PUBLICATIONS

Requirement for Restriction/Election issued on Aug. 3, 2009 for U.S. Appl. No. 12/276,903, filed Nov. 24, 2008 (Inventor—Drivdahl; Applicant—Boart Longyear) (9 pages).
Response to Restriction and Election of Species Requirement filed with the USPTO on Sep. 3, 2009 for U.S. Appl. No. 12/276,903, filed Nov. 24, 2008 (Inventor—Drivdahl; Applicant—Boart Longyear) (3 pages).
Non-Final Rejection issued on Sep. 24, 2009 for U.S. Appl. No. 12/276,903, filed Nov. 24, 2008 (Inventor—Drivdahl; Applicant—Boart Longyear) (9 pages).
Response to Non-Final Rejection filed with the USPTO on Nov. 23, 2009 for U.S. Appl. No. 12/276,903, filed Nov. 24, 2008 (Inventor—Drivdahl; Applicant—Boart Longyear) (12 pages).
Final Rejection issued on Jan. 19, 2010 for U.S. Appl. No. 12/276,903, filed Nov. 24, 2008 (Inventor—Drivdahl; Applicant—Boart Longyear) (9 pages).
Amendment and Response to Final Office Action filed with the USPTO on Apr. 14, 2010 for U.S. Appl. No. 12/276,903, filed Nov. 24, 2008 (Inventor—Drivdahl; Applicant—Boart Longyear) (10 pages).
Request for Continued Examination filed with the USPTO on Apr. 26, 2010 for U.S. Appl. No. 12/276,903, filed Nov. 24, 2008 (Inventor—Drivdahl; Applicant—Boart Longyear) (3 pages).
Final Rejection issued on Apr. 27, 2010 for U.S. Appl. No. 12/276,903, filed Nov. 24, 2008 (Inventor—Drivdahl; Applicant—Boart Longyear) (10 pages).
Amendment and Response to Final Office Action filed with the USPTO on Jul. 27, 2010 for U.S. Appl. No. 12/276,903, filed Nov. 24, 2008 (Inventor—Drivdahl; Applicant—Boart Longyear) (15 pages).
Request for Continued Examination filed with the USPTO on Jul. 27, 2010 for U.S. Appl. No. 12/276,903, filed Nov. 24, 2008 (Inventor—Drivdahl; Applicant—Boart Longyear) (3 pages).
Non-Final Rejection issued on Nov. 14, 2011 for U.S. Appl. No. 12/276,903, filed Nov. 24, 2008 [Inventor—Drivdahl; Applicant—Boart Longyear) (8 pages).
Amendment/ Request for Reconsideration after Non-Final Rejection filed with the USPTO on Dec. 11, 2011 for U.S. Appl. No. 12/276,903, filed Nov. 24, 2008 (Inventor—Drivdahl; Applicant—Boart Longyear) (11 pages).
Notice of Allowance issued on Feb. 9, 2012 for U.S. Appl. No. 12/276,903, filed Nov. 24, 2008 (Inventor—Drivdahl; Applicant—Boart Longyear) (7 pages).
Issue Notification issued on May 16, 2012 for U.S. Appl. No. 12/276,903, filed Nov. 24, 2008 (Inventor—Drivdahl; Applicant—Boart Longyear) (1 page).
Non-Final Rejection issued on May 21, 2009 for U.S. Appl. No. 12/276,870, filed Nov. 24, 2008 (Inventor—Drivdahl; Applicant—Boart Longyear) (10 pages).
Amendment and Response to Office Action filed with the USPTO on Oct. 21, 2009 for U.S. Appl. No. 12/276,870, filed Nov. 24, 2008 (Inventor—Drivdahl; Applicant—Boart Longyear) (14 pages).
Final Rejection issued on Nov. 27, 2009 for U.S. Application No. 12/276,870, filed Nov. 24, 2008 (Inventor—Drivdahl; Applicant—Boart Longyear) (6 pages).
Amendment and Response to Final Office Action filed with the USPTO on Mar. 29, 2010 for U.S. Appl. No. 12/276,870, filed Nov. 24, 2008 (Inventor—Drivdahl; Applicant—Boart Longyear) (12 pages).
Request for Continued Examination filed with the USPTO on Apr. 26, 2010 for U.S. Appl. No. 12/276,870, filed Nov. 24, 2008 (Inventor—Drivdahl; Applicant—Boart Longyear) (3 pages).
Non-Final Rejection issued on May 12, 2010 for U.S. Appl. No. 12/276,870, filed Nov. 24, 2008 (Inventor—Drivdahl; Applicant—Boart Longyear) (6 pages).
Amendment and Response to Office Action filed with the USPTO on Aug. 6, 2010 for U.S. Appl. No. 12/276,870, filed Nov. 24, 2008 (Inventor—Drivdahl; Applicant—Boart Longyear) (16 pages).
Non-Final Rejection issued on Oct. 19, 2010 for U.S. Appl. No. 12/276,870, filed Nov. 24, 2008 (Inventor—Drivdahl; Applicant—Boart Longyear) (8 pages).
Amendment and Response to Office Action filed with the USPTO on Feb. 12, 2011 for U.S. Appl. No. 12/276,870, filed Nov. 24, 2008 [Inventor—Drivdahl; Applicant—Boart Longyear) (14 pages).
Notice of Allowance issued on Mar. 7, 2011 for U.S. Appl. No. 12/276,870, filed Nov. 24, 2008 (Inventor—Drivdahl; Applicant—Boart Longyear) (7 pages).
Issue Notification issued on Jun. 22, 2011 for U.S. Appl. No. 12/276,870, filed Nov. 24, 2008 (Inventor—Drivdahl; Applicant—Boart Longyear) (1 page).
Non-Final Rejection issued on Nov. 14, 2011 for U.S. Appl. No. 12/561,936, filed Sep. 17, 2009 (Inventor—Drivdahl; Applicant—Boart Longyear) (10 pages).
Applicant-Initiated Interview Summary issued on Dec. 9, 2011 for U.S. Appl. No. 12/561,936, filed Sep. 17, 2009 (Inventor—Drivdahl; Applicant—Boart Longyear) (3 pages).
Notice of Allowance issued on Jan. 10, 2012 for U.S. Appl. No. 12/561,936, filed Sep. 17, 2009 (Inventor—Drivdahl; Applicant—Boart Longyear) (7 pages).
Issue Notification issued on Mar. 14, 2012 for U.S. Appl. No. 12/561,936, filed Sep. 17, 2009 (Inventor—Drivdahl; Applicant—Boart Longyear) (1 page).
Examiner's First Report issued on Oct. 21, 2010 for Australian Patent Application No. 2007342231, which was filed on Nov. 30, 2007 (Inventor—Drivdahl; Applicant—Boart Longyear) (3 pages).
Response to Examiner's First Report filed on Mar. 15, 2011 for Australian Patent Application No. 2007342231, which was filed on Nov. 30, 2007 (Inventor—Drivdahl; Applicant—Boart Longyear) (23 pages).
Examiner's Second Report issued on Mar. 21, 2011 for Australian Patent Application No. 2007342231, which was filed on Nov. 30, 2007 (Inventor—Drivdahl; Applicant—Boart Longyear) (2 pages).
Notice of Acceptance issued on Jun. 9, 2011 for Australian Patent Application No. 2007342231, which was filed on Nov. 30, 2007 (Inventor—Drivdahl; Applicant—Boart Longyear) (1 page).
Examiner's First Report issued on May 22, 2012 for Australian Patent Application No. 2011226850, which was filed on Nov. 30, 2007 (Inventor—Drivdahl; Applicant—Boart Longyear) (3 pages).
Examiner's First Report issued on May 21, 2012 for Australian Patent Application No. 2011226848, which was filed on Nov. 30, 2007 (Inventor—Drivdahl; Applicant—Boart Lonyear) (4 pages).
Examiner's First Report issued on May 7, 2012 for Australian Patent Application No. 2011226849, which was filed on Nov. 30, 2007 (Inventor—Drivdahl; Applicant—Boart Longyear) (3 pages).
Response to Examination Report filed on Aug. 8, 2012 for Australian Patent Application No. 2011226849, which was filed on Nov. 30, 2007 (Inventor—Drivdahl; Applicant—Boart Longyear) (13 pages).
Notice of Acceptance issued on Aug. 27, 2012 for Australian Patent Application No. 2011226849, which was filed on Nov. 30, 2007 (Inventor—Drivdahl; Applicant—Boart Longyear) (3 pages).
Letters Patent issued on Dec. 20, 2012 for Australian Patent Application No. 2011226849, which was filed on Nov. 30, 2007 (Inventor—Drivdahl; Applicant—Boart Longyear) (23 pages).
Examiner's First Report issued on Feb. 13, 2013 for Australian Patent Application No. 2012211429, which was filed on 08/08112 (Inventor—Drivdahl; Applicant—Boart Longyear) (2 pages).
Examiner's First Report issued on Feb. 13, 2013 for Australian Patent Application No. 2012211431, which was filed on 08/08112 (Inventor—Drivdahl; Applicant—Boart Longyear) (2 pages).
Office Action issued on Dec. 9, 2010 for Canadian Application No. 2,267,193, which was filed on Nov. 30, 2007 (Inventor—Drivdahl; Applicant—Boart Longyear) (2 pages).
Response to Office Action filed on Jun. 8, 2011 for Canadian Application No. 2,267, 193, which was filed on Nov. 30, 2007 (Inventor—Drivdahl; Applicant—Boart Longyear) (10 pages).
Amendment filed on Jan. 27, 2012 for Canadian Application No. 2,267,193, which was filed on Nov. 30, 2007 (Inventor—Drivdahl; Applicant—Boart Longyear) (11 pages).

(56) References Cited

OTHER PUBLICATIONS

First Office Action issued on Sep. 21, 2011 for Chinese Patent Application No. 200780050729.8, which was filed on Nov. 30, 2007 (Inventor—Drivdahl; Applicant—Boart Longyear) (11 pages).
Response to Office Action filed on Dec. 23, 2011 for Chinese Patent Application No. 200780050729.8, which was filed on Nov. 30, 2007 (Inventor—Drivdahl; Applicant—Boart Longyear) (8 pages).
Second Office Action issued on Mar. 21, 2012 for Chinese Patent Application No. 200780050729.8, which was filed on Nov. 30, 2007 (Inventor—Drivdahl; Applicant—Boart Longyear) (13 pages).
Third Office Action issued on Jun. 3, 2012 for Chinese Patent Application No. 200780050729.8, which was filed on Nov. 30, 2007 (Inventor—Drivdahl; Applicant—Boart Longyear (5 pages).
Response to Office Action filed on Jul. 3, 2012 for Chinese Patent Application No. 200780050729.8, which was filed on Nov. 30, 2007 (Inventor—Drivdahl; Applicant—Boart Longyear) (10 pages).
Amendment and Response to Office Action filed on Sep. 17, 2012 for Chinese PatentApplication No. 200780050729.8, which was filed on Nov. 30, 2007 (Inventor—Drivdahl; Applicant—Boart Longyear) (10 pages).
Fourth Office Action issued on Sep. 28, 2012 for Chinese Patent Application No. 200780050729.8, which was filed on Nov. 30, 2007 (Inventor—Drivdahl; Applicant—Boart Longyear) (6 pages).
Response to Office Action filed on Dec. 4, 2012 for Chinese Patent Application No. 200780050729.8, which was filed on Nov. 30, 2007 (Inventor—Drivdahl; Applicant—Boart Longyear) (9 pages).
Notice of Allowance issued on Feb. 6, 2013 for Chinese Patent Application No. 200780050729.8, which was filed on Nov. 30, 2007 (Inventor—Drivdahl; Applicant—Boart Longyear) (2 pages).
Applicant to Amend a Complete Specification filed on Jun. 14, 2010 for South African Patent Application No. 2009/03902, which was filed on Nov. 30, 2007 (Inventor—Drivdahl; Applicant—Boart Longyear) (1 page).
Letters Patent Issued on May 25, 2011 for South African Patent Application No. 2009/03902, which was filed on Nov. 30, 2007 (Inventor—Drivdahl; Applicant—Boart Longyear) (1 page).
Letters Patent Issued on Feb. 29, 2012 for South African Patent Application No. 2010/04148, which was filed on Jun. 10, 2012 (Inventor—Drivdahl; Applicant—Boart Longyear) (1 page).
Letters Patent Issued on Feb. 29, 2012 for South African Patent Application No. 2010/04149, which was filed on Jun. 10, 2012 (Inventor—Drivdahl; Applicant—Boart Longyear) (1 page).
Letters Patent Issued on Feb. 29, 2012 for South African Patent Application No. 2010/04150, which was filed on Jun. 10, 2012 (Inventor—Drivdahl; Applicant—Boart Longyear) (1 page).
International Preliminary Report on Patentability issued by the International Bureau on Aug. 5, 2008 for PCT/US2007/086156, which was filed on Nov. 30, 2007 and published as WO 2008085616 on Jul. 17, 2008 (Inventor—Drivdahl; Applicant—Boart Longyear) (14 pages).
International Search Report and Written Opinion issued by the International Bureau on Aug. 5, 2008 for PCT/US2007/086156, which was filed on Nov. 30, 2007 and published as WO 2008085616 on Jul. 17, 2008 (Inventor—Drivdahl; Applicant—Boart Longyear) (14 pages).
Non-Final Office Action issued Apr. 8, 2013 for U.S. Appl. No. 13/477,989, filed May 22, 2012 and published as U.S. 2012/0228036 on Sep. 13, 2012 (Inventor—Drivdahl; Applicant—Boart Longyear) (8 Pages).
Applicant's Arguments and Remarks Made in an Amendment filed Jul. 8, 2013 for U.S. Appl. No. 13/477,989, filed May 22, 2012 and published as U.S. 2012/02258036 on Sep. 13, 2012 (Inventor: Drivdahl; Applicant—Boart Longyear) (3 Pages).
Amendment and Request for Reconsideration After Non-Final Office Action Filed Jul. 8, 2013 for U.S. Appl. No. 13/477,989, filed May 22, 2012 and Published as U.S. 2012/0228036 on Sep. 13, 2012 (Inventor: Drivdahl; Applicant—Boart Longyear) (1 Page).
Non-Final Office Action issued Oct. 23, 2013 for U.S. Appl. No. 13/477,989, filed May 22, 2012 and published as U.S. 2012/0228036 on Sep. 13, 2012 Inventor: Drivdahl; Applicant—Boart Longyear) (7 Pages).
Applicant's Arguments and Remarks Made in an Amendment filed Jan. 23, 2014 for U.S. Appl. No. 13/477,989, filed May 22, 2012 and published as U.S. 2012/0228036 on Sep. 13, 2012 Inventor: Drivdahl; Applicant—Boart Longyear) (2 Pages).
Amendment and Request for Reconsideration After Non-Final Office Action filed Jan. 23, 2014 for U.S. Appl. No. 13/477,989, filed May 22, 2012 and published as U.S. 2012/0228036 on Sep. 13, 2012 Inventor: Drivdahl; Applicant—Boart Longyear) (1 Page).
Notice of Allowance issued Mar. 11, 2014 for U.S. Appl. No. 13/477,989, filed May 22, 2012 and published as U.S. 2012/0228036 on Sep. 13, 2012 Inventor—Drivdahl; Applicant—Boart Longyear) (6 Pages).
Beaton, T. and K. Johnson, New Technology in Diamond Drill Bits Improves Performance in Variable Formations, IADC/SPE Drilling Conference, pp. 1-7 (2000).
International Search Report and Written Opinion mailed on Jul. 8, 2015 by the International Searching Authority for International Patent Application No. PCT/US2015/022965, which was filed on Mar. 27, 2015 and published as WO 2015/148910 on Oct. 1, 2015 (Inventor—Drivdahl et al.; Applicant—Longyear TM, Inc.) (7 pages).
European Search Report and Written Opinion issued on Aug. 26, 2015 by the European Patent Office for European Patent Application No. 07865035.5, which was filed on Jun. 26, 2009 and published as 2092155 on Aug. 26, 2009 (Inventor—Drivdahl et al.; Applicant—Longyear TM, Inc.) (5 pages).
Extended European Search Report issued on Sep. 25, 2015 by the European Patent Office for application 12826384.5, filed on Jun. 25, 2012, and published as EP 2748403 on Jul. 2, 2014 (Applicant—Longyear TM, Inc. // Inventor—Rupp, et al.) (6 pages).
Non-Final Office Action issued Dec. 15, 2015 for U.S. Appl. No. 14/319,763, filed Jun. 30, 2014, and published as U.S. 2014/0311809 on Oct. 23, 2014 (Inventor: Drivdahl; Applicant—Boart Longyear (15 Pages).

FIBER-CONTAINING DIAMOND-IMPREGNATED CUTTING TOOLS AND METHODS OF FORMING AND USING SAME

CROSS-REFERENCE TO RELATED APPLICATIONS

This patent application is a continuation-in-part of U.S. patent application Ser. No. 13/477,989, filed May 22, 2012, now U.S. Pat. No. 8,783,381, which is a continuation application of U.S. patent application Ser. No. 12/276,903, filed Nov. 24, 2008, now U.S. Pat. No. 8,191,445, entitled "Methods of Forming and Using Fiber-Containing Diamond-Impregnated Cutting Tools," which is a divisional application of U.S. patent application Ser. No. 11/948,185, now U.S. Pat. No. 7,695,542, filed on Nov. 30, 2007, entitled "Fiber-Containing Diamond-Impregnated Cutting Tools," which claims priority to and the benefit of U.S. Provisional Application Ser. No. 60/917,016, filed May 9, 2007, entitled "Fiber-Reinforced Diamond Wire," and U.S. Provisional Application Ser. No. 60/867,882, filed Nov. 30, 2006, entitled "Fiber-Reinforced Core Drill Bit." The contents of each of the three above-referenced applications are hereby incorporated by reference in their entirety.

BACKGROUND OF THE INVENTION

The Field of the Invention

This application relates generally to cutting tools and their methods of use. In particular, this application relates to diamond-impregnated cutting tools that may contain fibers.

Discussion of the Relevant Art

Cutting tools can be impregnated with diamonds so that they can be used to grind, polish, or otherwise cut a variety of materials that normal cutting tools cannot. The part of these tools that performs the cutting action (or the cutting portion of the tool) is generally formed of a matrix that contains a powdered metal or a hard particulate material, such as tungsten carbide. This material is sometimes infiltrated with a binder, such as a copper alloy. Finally, the cutting portion of these tools is impregnated with diamond crystals or some other form of abrasive cutting media. As the tool grinds and cuts the desired materials, the cutting portion of the tool erodes and exposes new layers of the diamond crystal (or other cutting media) so that a sharp surface is always available for the cutting process. Any diamond-impregnated cutting tool may continue to cut efficiently until the diamond impregnated portion of the tool is completely consumed. At that point, the tool becomes dull and must be replaced with another one.

In some cases, diamond-impregnated cutting tools may be expensive and their replacement may be time consuming, costly, as well as dangerous. For example, the replacement of a diamond-impregnated core sampling drill bit requires removing (or tripping out) the entire drill string out of the hole that has been drilled (the borehole). Each section of the drill rod must be sequentially removed from the borehole. Once the drill bit is replaced, the entire drill string must be assembled section by section and then tripped back into the borehole. Depending on the depth of the hole and the characteristics of the materials being drilled, this process may need to be repeated multiple times for a single borehole.

As well, conventional diamond-impregnated cutting tools often have several characteristics that can add to the consumption rate of the cutting portion and, therefore, increase the operating costs associated with those cutting tools. First, the binder materials in the tools may be relatively soft in comparison to the cutting media. Accordingly, the cutting portion may erode and allow diamonds or other abrasive cutting materials to slough off prematurely. Second, the erosion rate of the cutting portion can be increased by insufficient lubrication to and around the cutting face of the tool, or the interface between the cutting portion of the tool and the material being cut. Third, conventional impregnated cutting tools may also be too wear resistant to expose and renew layers of the cutting portion.

SUMMARY

This application describes diamond-impregnated cutting tools and their associated methods for manufacture and use. The cutting tools contain a diamond-impregnated cutting portion that may contain fibers made from carbon, glass, ceramic, polymer, and the like. The fibers can be in any form, including chopped and milled fibers. The fibers may also be coated with metal, ceramic, or other performance-enhancing coatings. The fibers may be used to both control the tensile strength control the erosion rate of the matrix in the cutting portion to optimize the cutting performance of the tools. Additionally, the fibers may also weaken the structure and allow higher modulus binders to be used for the cutting tools at a lower cost, allowing the amount of fibers to be tailored to retain the diamonds in the cutting portion for the desired amount of time. And as the cutting portion erodes, the fibers may also increase the lubricity at the face of the cutting portion. Using the fibers allows the cutting tools to last longer and make them safer and more economical because they need to be replaced less often.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The following description can be better understood in light of the Figures, in which.

Figure 1:
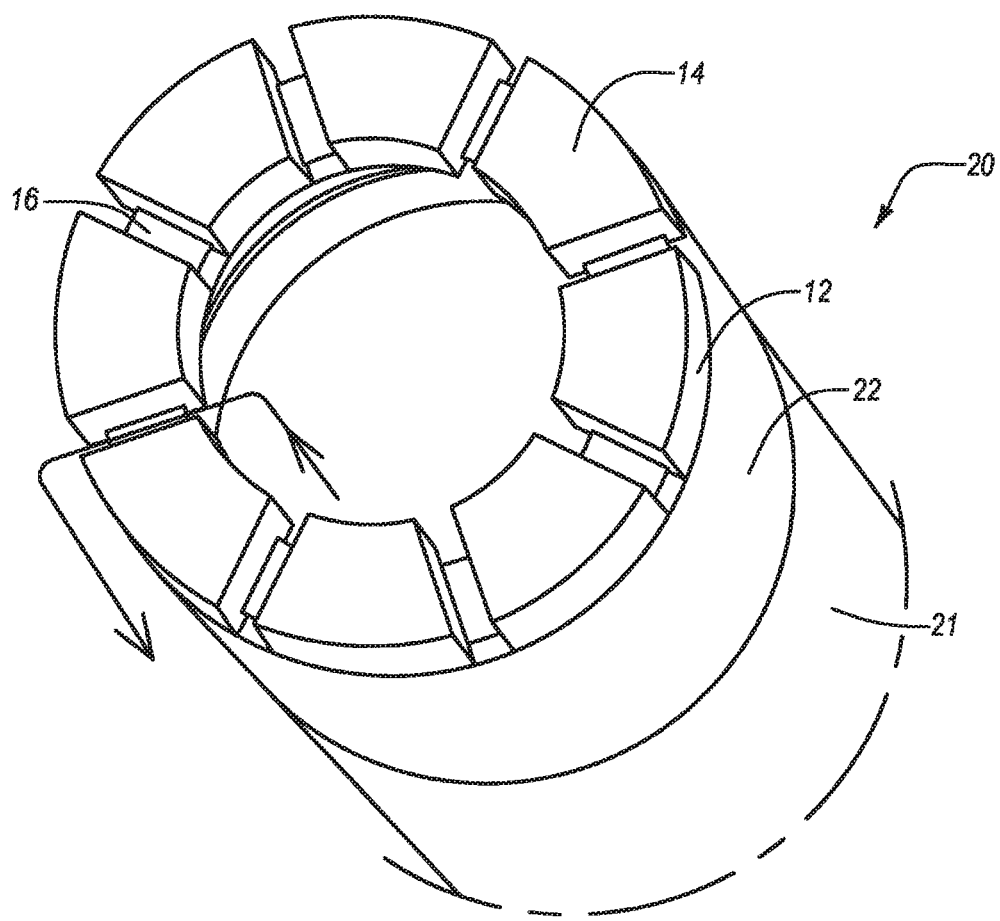
FIG. 1 contains an exemplary view of a core sampling drill bit.

Together with the following description, the Figures may help demonstrate and explain the principles of the invention and methods for using the invention. In the Figures, the thickness and configuration of components may be exaggerated for clarity. The same reference numerals in different Figures represent the same component.

DETAILED DESCRIPTION

The present invention may be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a fiber" can include two or more such fibers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The cutting tools described herein can be used to cut stone, subterranean mineral formations, ceramics, asphalt, concrete, and other hard materials. These cutting tools may include core sampling drill bits, drag-type drill bits, roller cone drill bits, diamond wire, grinding cups, diamond blades, tuck pointers, crack chasers, and the like. For example, the cutting tools may be any type of earth drill bit (i.e., core sampling drill bit, drag drill bit, roller cone bit, navi-drill, full hole drill, hole saw, hole opener, etc.), diamond saw blade (e.g., laser welded blade, concave diamond blade, segmented blade, continuous rim blade, wavy core blade, ventilated core blade, etc.), grinding cup (e.g., single row cup, double row cup, grinding cup with T-shaped segments, etc.), tuck pointer (e.g., triple row, etc.), crack chaser, polishing disk, and so forth. In some embodiments, though, the cutting tools are core sampling drill bits and diamond wire.

The part of the cutting tools that performs the cutting action (or the cutting portion of the tool) contains a matrix with a powdered metal or a hard particulate material, such as tungsten carbide or any other super-abrasive material. This material can sometimes be infiltrated with a binder, such as a copper alloy or a substantial equivalent, and can be sintered to form a segment. The cutting portion of these tools can also be impregnated with diamonds, or some other form of abrasive cutting media, and mixed (and, in some embodiments, reinforced) with fibrous materials (or fibers) as described in detail in the embodiments where the cutting tool is a core sampling drill bit and a diamond wire.

FIG. 1 illustrates one example of a fiber-containing cutting tool, a fiber-containing (and, in some embodiments, fiber-reinforced) core sampling drill bit. As shown in FIG. 1, the drill bit 20 contains a first section 21 that connects to the rest of the drill string. The drill bit 20 also contains a second section 22 that is used to cut the desired materials during the drilling process. The body of the drill bit 20 has an outer surface and an inner surface containing a hollow portion therein. With this configuration, pieces of the material being drilled can pass through the hollow portion, up into a drill string to which the drill bit is connected, and then be collected.

The drill bit 20 may be any size, and may therefore be used to collect core samples of any size. While the drill bit may have any circumference and may be used to remove and collect core samples with any desired diameter, the diameter generally ranges from about 1 to about 12 inches. As well, while the kerf of the drill bit (the radius of the outer surface minus the radius of the inner surface) may be any width, it generally ranges from about ½ of an inch to about 6 inches.

The first section 21 of the drill bit may be made of any suitable material known in the art. In some embodiments, the first section may be made of steel or a matrix casting of a hard particulate material in a binder. In some embodiments, the first section 21 may contain a chuck end, sometimes called a blank, bit body, or shank, that may be used for any purpose, including connecting the drill bit to the nearest part of the drill string. Thus, the chuck end can be configured as known in the art to connect the drill bit 20 to any desired part of the drill string.

The second section 22 of the core sampling drill bit 20 contains a cutting portion with cutting elements 12 having a cutting face 14. The cutting elements 12 have a space 16 between them so that, as known in the art, a drilling fluid following the path shown by the arrow may be used during drilling. The cutting portion of the core sampling drill bit, often called the crown, may be constructed of any material(s) known in the art. This type of drill bit (a core sampling bit) is generally formed of steel or a matrix of powdered metal, which is a hard particulate material, such as tungsten carbide, tungsten, iron, cobalt, and/or molybdenum. This material may then be infiltrated with a binder, such as a copper alloy, zinc, silver, molybdenum, nickel, cobalt, or a substantial equivalent, and/or may be sintered. The cutting portion of the drill bit may also be impregnated with any form or combination of forms of cutting media, such as diamond crystals.

The cutting media used in the drill bit may have any desired characteristic or grain, quality, grit, concentration, etc. In some embodiments, the cutting media may be very small and substantially round in order to leave a smooth finish on the material being cut by the core sampling drill bit. In other embodiments, the cutting media may be larger to cut aggressively into the material being cut.

The cutting media may be contained homogeneously or heterogeneously in the drill bit. As well, the cutting media may be aligned in a particular manner so that the cutting properties of the media are presented in an advantageous position with respect to the cutting portion of the drill bit. Similarly, the cutting media may be contained in the drill bit in a variety of densities as desired for a particular use. For example, large abrasive particles spaced further apart may cut material more quickly than small abrasive particles packed tightly together. But the size, density, and shape of the abrasive particles may be provided in a variety of combinations depending on desired cost and performance of the drill bit.

In some instances, the cutting portion of the drill bit may be made of one or more layers. For example, the cutting portion may contain two layers: a matrix layer that performs the cutting operation and a backing layer, which connects the matrix layer to the first section of the drill bit. In these embodiments, the matrix layer contains the actual cutting media that abrades and erodes the material being drilled. The portion of the matrix layer that comes in contact with the material being cut is known as the cutting face.

Another embodiment of a cutting tool comprises a fiber-containing (and, in some embodiments, a fiber-reinforced) diamond wire segments or beads. Diamond wire may be used to cut a variety of hard materials. For example, a relatively large diamond wire may be used to cut large blocks of granite out of a granite formation in a quarry for further processing. However, in other uses, a relatively small diamond wire may be used in a laboratory to cut a sample of a hard material for testing.

Figure 2:
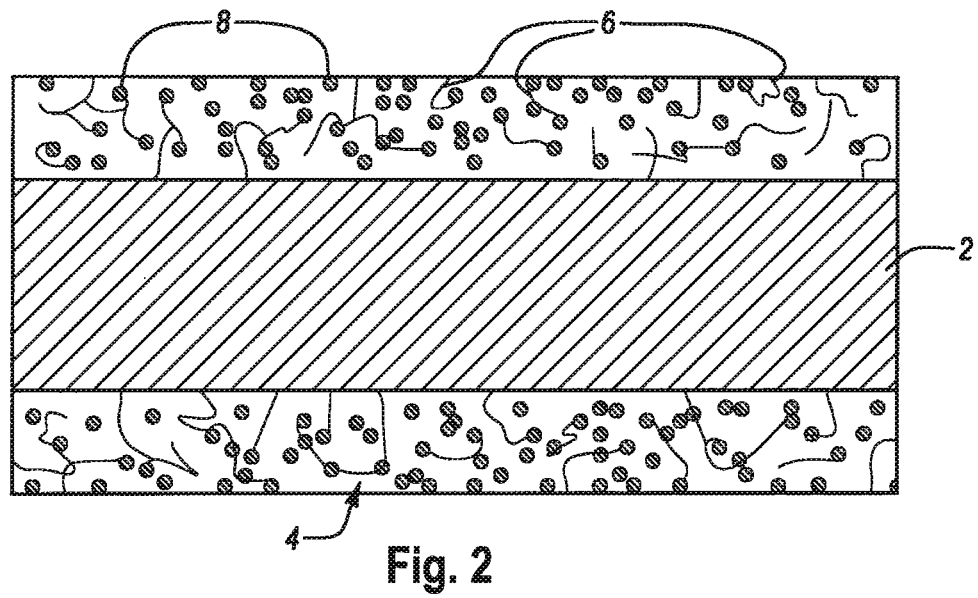
FIG. 2 contains an exemplary view of a cross section of a diamond wire.

One example a diamond wire is shown in FIG. 2. In FIG. 2, the diamond wires contain a core wire 2 made of any suitable strong material, such as steel, that may be coated with a cutting material coating 4. The coating 4 in such wires may act as the cutting portion of the diamond wire. The coating 4 may contain a binder (e.g., a copper alloy, iron, silicon carbide, etc.) and a base material that may be formed from steel or a matrix of powdered metal/hard particulate material (e.g., tungsten carbide, tungsten, iron, cobalt, molybdenum, etc.). The coating 4 may also be impregnated with any cutting media 8, such as diamond crystals. The cutting media 8 in the coating 4 may have any desired characteristic, including any size, shape, alignment, grain, quality, grit, concentration, disbursement, and so forth.

In some instances, the coating 4 of the diamond wire may be made of one or more layers. In such embodiments, each layer may be made of any desired material. For example, the backing layer may contain an iron alloy and the bond between the matrix and backing layer is usually achieved with a copper alloy or braze alloy.

Figure 3:
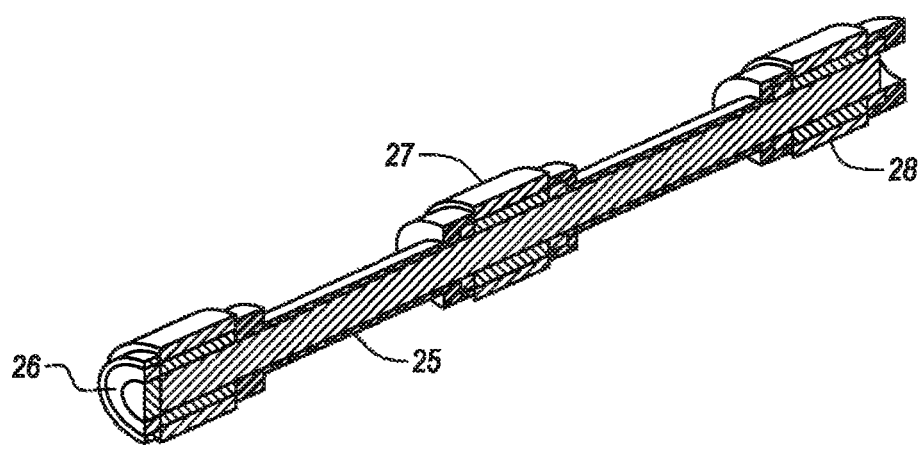
FIG. 3 contains an exemplary view of a cross section of another diamond wire.

FIG. 3 illustrates another example of a fiber-containing diamond wire. As shown in FIG. 3, the diamond wires may have abrasive beads that are applied to a core portions on the diamond wire. The abrasive beads may be formed from any suitable material. For example, the abrasive beads may have a diamond matrix 27 formed of a base material, like powdered metal or a hard particulate material (e.g., tungsten carbide, tungsten, cobalt, molybdenum, etc.). The base material may be infiltrated with a binding material (e.g., a copper alloy). And the abrasive beads may be impregnated with any cutting media (e.g., diamond crystals) having any desired characteristic, including any size, shape, alignment, grain, quality, grit, concentration, disbursement, and the like.

Figure 4:
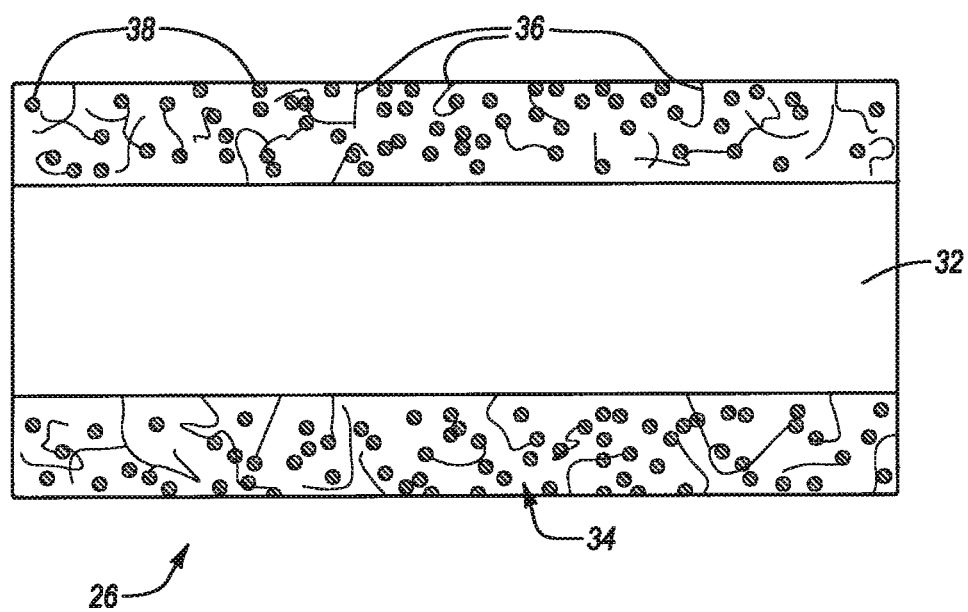
FIG. 4 contains an exemplary view of a cross section of an individual diamond wire bead.

FIG. 4 illustrates an individual diamond wire bead 26 that is used with the diamond wire shown in FIG. 3. The bead 26 may be of any shape and size known in the art and may be applied to the core wire in any manner known in the art. The diamond wire in FIG. 3, for example, may be made by manufacturing the bead 26 to contain a coating 34 with abrasive particles 38 and fibers 36 and a channel 32. In this example, the bead 26 may then be attached to a steel ferrule, which may be threaded onto the core wire. Therefore, the beads 26 on the diamond wire may be manufactured separately from the core wire and then strung on the core wire with other beads to create the diamond wire. An encapsulant, usually a rubber 25 or some other polymeric material, can be coated on the core wire between the beads as known in the art to create the diamond wire.

The diamond wires may also be any size and may therefore be used in any known process using diamond wire. For example, the diamond wire in FIG. 3 may range in length from about 5 meters to more than 100 meters and have beads 26 with a diameter of from about 4 millimeters to about 12 millimeters. And for the diamond wire in FIG. 2, the length can be about 10 centimeters long and the diameter of the core wire and cutting material coating can be about a few microns. Nevertheless, the diamond wire can be longer or shorter than the lengths in the previous examples and may also have beads and a cable of any desired diameter.

In addition to these features, the diamond-impregnated cutting tools—including the core sampling drill bits or diamond wires—may have any additional feature known in the art. For example, a core sampling drill bit may have additional gauge protection, hard-strip deposits, various bit profiles, and combinations thereof. Protector gauges on or in a drill bit may be included to reduce the damage to the drill bit and well casing as the drill bit cuts the formation. Additionally, the core sampling drill bit may have hard-metal strips applied that may prevent the premature erosion of the support portion of the drill bit.

The cutting portion(s) of the diamond-impregnated cutting tools contain fibers. Any known fiber, or combination of fibers, may be added to the cutting tool. In some embodiments, the cutting portion of a diamond-impregnated cutting tool may include fibers such as carbon fibers, metal fibers (e.g., fibers made of tungsten, tungsten carbide, iron, molybdenum, cobalt, or combinations thereof), glass fibers, polymeric fibers (e.g., fibers made of Kevlar), ceramic fibers (e.g., fibers made of silicon carbide), coated fibers, and/or the like.

For example, and with limitation, it is contemplated that exemplary metal fibers can comprise steel alloys such as, without limitation, carbon steel (low/mild/high alloy), ferroalloys, cast iron alloys, pig iron alloys, chromoly steel alloys, high-speed steel alloys, stainless steel alloys, tool steel alloys, and the like.

In one exemplary aspect, the exemplary steel fiber can have a 0.1 mm diameter×1.7 mm length and can comprise medium carbon low-alloy steel. Optionally, the exemplary steel fiber can be sized between about 0.004 mm to about 15 mm in diameter and between about 0.05 mm to about 75 mm in length. In a further aspect, the exemplary steel fiber can be sized between about 0.008 mm to about 10 mm in diameter and between about 0.1 mm to about 50 mm in length.

In a further aspect, it is contemplated that the typical composition of the steel metal fiber can comprise at least one or more of: Aluminum (between about 0.95% to about 1.3%); Bismuth (0.01% to about 0.15%); Carbon (between about 0.05% to about 2.1%); Chromium (between about 0.5% to about 18.0%); Copper (between about 0.1% to about 0.4%); Lead (0.01% to about 0.15%); Manganese (between about 0.25% to about 18.0%); Molybdenum (between about 0.2% to about 5.0%); Nickel (between about 2.0% to about 20.0%); Silicon (between about 0.2% to about 2.0%); Sulfur (between about 0.08% to about 0.15%); Titanium (0.01% to about 0.15%); Tungsten (0.01% to about 3.0%); Vanadium (0.01% to about 0.15%) and Iron.

Optionally, it is contemplated that the metal fibers can comprise one or more of alloys selected from titanium and titanium alloys, cobalt and cobalt alloys, nickel and nickel alloys, manganese and manganese alloys, chromium and chromium alloys, and the like. In a further aspect, the coating materials described herein can comprise can comprise one or more of alloys selected from titanium and titanium alloys, cobalt and cobalt alloys, copper and copper alloys, nickel and nickel alloys, manganese and manganese alloys, chromium and chromium alloys, tin and tin alloys, tungsten and tungsten alloys, and zinc and zinc alloys.

In some embodiments, the cutting portion of a diamond-impregnated cutting tool may contain any carbon fibers. Any known type of carbon fiber may be included in the cutting portion of a diamond-impregnated cutting tool.

In some embodiments, the fibers may optionally be coated with one or more additional material(s) before being included in the cutting tool. Such coatings may be used for any performance-enhancing purpose. For example, a fiber coating may be used to help retain fibers in the cutting tool. In another example, a fiber coating may be used to increase lubricity near the cutting face of a cutting tool as the fiber coating erodes away and forms a fine particulate material that acts to reduce friction. In yet another example, a fiber coating may act as an abrasive material and thereby be used to aid in the cutting process.

Any known material may be used to coat the type of fiber(s) that is used in the cutting tool. For example, any desired metal, ceramic, polymer, glass, sizing, wetting agent, flux, or other substance could be used to coat a desired type of fiber(s) that may be included in a cutting tool. In one example, carbon fibers could be coated with a metal, such as iron, titanium, nickel, copper, molybdenum, lead, tungsten, aluminum, chromium, tungsten, copper, tin, zinc or combinations thereof. In another example, carbon fibers may be coated with a ceramic material, such as SiC, SiO, SiO2, or the like.

Where fibers are coated with one or more coatings, the coating material may cover any portion of the fibers and may be of any desired thickness. Accordingly, a coating material may be applied to the fibers in any manner known in the art. For example, the coating may be applied to fibers through spraying, brushing, electroplating, immersion, vapor deposition, or chemical vapor deposition.

The fibers in the cutting portion of a diamond-impregnated cutting tool, such as a core sampling drill bit, may be of any size or combination of sizes, including mixtures of different sizes. For instance, fibers may be of any length and have any desired diameter. In some embodiments, the fibers may be approximately 10 to about 25,000 microns long and may have a diameter of approximately 1 to about 500 microns. In other embodiments, the fibers may be approximately 150 microns in length and may have a diameter of approximately 7 microns.

The fibers may be of any shape or combination of shapes. The fibers may be ribbon-like, cylindrical, polygonal, elliptical, straight, curved, curly, coiled, bent at angles, etc. For instance, FIG. 2 illustrates that in some embodiments, the majority of the fibers 6 may be curved. In other embodiments, such as when the cutting tool comprises a core sampling drill bit, the fibers have a substantially cylindrical shape.

Additionally, the fibers may also be of any type or combination of types. Examples of the types of fibers include chopped, milled, braided, woven, grouped and wound, or tows. In some embodiments, such as when the cutting tool comprises a core sampling drill bit, the fibers can contain a mixture of chopped and milled fibers. In some embodiments, a diamond-impregnated cutting tool contains one type of fiber. In other embodiments, though, the cutting tool may contain multiple types of fibers. In such instances, where a cutting tool contains more than one type of fiber, any combination of fiber type, quality, size, shape, grade, coating, and/or fiber with any other characteristic may be used.

The fibers may be found in any desired concentration in the cutting tool. For instance, the cutting portion of a cutting tool may have a very high concentration of fibers, a very low concentration of fibers, or any concentration in between. In some embodiments, the cutting tool may contain fibers ranging from about 0.1 to about 70 vol %. In other embodiments, the cutting tool may contain fibers ranging from about 0.1 to about 30 vol %. A first portion of the cutting tool may have a first concentration of a particular type of reinforcing fiber and another portion may have a different concentration (either lower or higher) of the same or another type of reinforcing fiber.

In some embodiments, fibers may be homogenously dispersed throughout the cutting portion of a cutting tool. In other embodiments, though, the concentration of fibers may vary throughout any desired portion of a cutting tool, as desired. Indeed, any desired variation of the concentration of fibers may be implemented in a cutting tool. For example, where the cutting tool comprises a core sampling drill bit, it may contain a gradient of fibers. In this example, the portion of the matrix layer that is closest to the cutting face of the drill bit may contain a first concentration of fibers and the concentration of fibers could gradually decrease or increase towards the backing layer. Such a drill bit may be used to drill a formation that begins with a soft, abrasive, unconsolidated formation, which gradually shifts to a hard, non-consolidated formation. Thus, the dispersal of the fibers in the drill bit can be customized to the desired earth formation through which it will be drilling.

The fiber concentration may also vary in any desired manner in the cutting tool. In other words, a cutting tool may comprise sections, strips, spots, rings, or any other formation that contains a different concentration or mixture of fiber reinforcements than other parts of the cutting tool. For example, the cutting portion of a drill bit may comprise multiple layers, rings, or segments of matrix layer containing fibers. Each ring, layer, or segment of the drill bit may have a roughly homogenous (or heterogeneous) concentration of fibers throughout the entire ring, layer or segment. Yet the concentration of fibers may vary from ring to ring (or from segment to segment, etc. . . . ). And the various rings of differing fiber gradients may be arranged in any order, may contain different fibers or combinations of fibers, and may be of any desired thickness. In another example, the outer and inner surfaces of a drill bit could be provided with a different concentration of fibers than the inner parts of the drill bit.

The fibers may be located in the cutting portion of a cutting tool in any desired orientation or alignment. In some embodiments, the fibers may run roughly parallel to each other in any desired direction. However, FIGS. 2 and 4 illustrate that, in other embodiments, the fibers may be randomly configured and may thereby be oriented in practically any and/or every direction.

The diamond-impregnated cutting tools with fibers can be made using any known method that provides them with the features described above. For example, the drill bit described above can be made in the following exemplary manner. In this example, the first section of the drill bit can be made with any known method. The fibers can be incorporated into the drill bit using any method that provides the desired fibers in the desired location with the desired concentration. For instance, the fibers may be mixed in with the powdered metal that is used to make the crown of the drill bit. This mixture may then be sintered and/or infiltrated with a binder. In other embodiments, though, the fibers may be incorporated by just placing them into the mold that is used to make the crown of the drill bit. The first section of the drill bit can then be connected to the second section using any method known in the art. For example, the first section may be present in the mold that is used to form the second section of the drill bit and the two ends of the body may be fused together. Alternatively, the first and second sections can be mated in a secondary process such as by brazing, welding, or adhesive bonding.

The diamond-impregnated cutting tools with fibers may be used for any purpose known in the art, which depends on the type of cutting tool. For example, a diamond-impregnated core sampling drill bit may be attached to the end of a drill string, which is in turn connected to a drilling rig. As the drill string and therefore the drill bit is rotated and pushed by the drill bit, it grinds away the materials in the subterranean formations that are being drilled. The core samples that are drilled away are withdrawn from the drill string. The cutting portion of the drill bit will erode over time because of the grinding action. This process may continue until the cutting portion of a drill bit has been consumed and the drilling string need be tripped out of the borehole and the drill bit replaced.

The described fibers give diamond-impregnated cutting tools several added advantages when compared to conventional cutting tools that lack fibers. First, the addition of the fibers can control the tensile strength and the erosion rate of the cutting tool, whether to strengthen or weaken these properties. Without being restricted to this understanding, it is believed that the presence of the fibers can be used to modify the amount of voids in the cutting portion of the tools. And since the tensile strength and erosion rate depend on the amount of voids, modifying the amount of the fibers can be used to tailor the tensile strength and the erosion rate to the amount needed for the particular end use of the cutting tool. This increased tensile strength can also increase the life of a cutting tool, allowing the cutting portion of the tools to wear at a desired pace and improving the rate at which the tool cuts.

Second, the addition of fibers may also weaken the structure of the cutting portion and allow higher modulus binders to be used for the cutting tools, but at a lower cost. Thus, the amount of fibers in the cutting portion can be tailored to retain the diamonds in the cutting portion for the desired length of time.

A third advantage is that the fibers may also act as abrasive cutting media that aid in the cutting process. A fourth advantage is that as the fibers in the cutting portion erode away, their fine particulate matter can reduce friction and increase the lubrication at the interface between the cutting portion and the surface being cut, allowing easier cutting and better flushing. This increased lubrication may also reduce the amount of cutting lubricants (such as drilling muds, polymers, bentonites, etc. . . . ) that are needed, reducing the costs as well as the environmental impact that can be associated with using diamond-impregnated cutting tools.

EXAMPLE

In one example of a comparison between a conventional diamond-impregnated cutting tool (one lacking fibers) and a fiber-containing diamond-impregnated cutting tool, two sets of substantially similar drill bits were manufactured. In this comparison, the first set of drill bits contained no fibers and the second set was reinforced with carbon fibers. Each drill bit was then tested and the following properties were measured.

Penetration Rate: The average penetration rates of the first set of drill bits ranged from about 30 to about 40 meters per shift. Nevertheless, with the second set of fiber-reinforced bits, the drillers consistently achieved about 50 meters per shift. This equates to an increase in penetration rate of about 25% to about 67%.

Bit life: The average bit life of the first set of drill bits was 64 meters. Conversely, the average bit life of the second set of drill bits was about 104 meters. This equates to an increase in bit life of about 60%.

In addition to any previously indicated modification, numerous other variations and alternative arrangements may be devised by those skilled in the art without departing from the spirit and scope of the above description, and appended claims are intended above with particularity and detail in connection with what is presently deemed to be the most practical and exemplary embodiments, it will be apparent to those of ordinary in the art that numerous modifications, including, but not limited to, form, functions, manner of operation and use may be made without departing from the principles and concepts set forth herein. Also, as used herein, examples and embodiments are meant to be illustrative only and should not be construed as limiting in any manner.

What is claimed is:

1. A cutting tool comprising a cutting section, the cutting section comprising:
   a matrix of hard particulate material;
   a binder infiltrated therein the matrix of hard particulate material;
   a plurality of cutting media dispersed within the matrix of hard particulate material; and
   a plurality of metal fibers dispersed within the matrix of hard particulate material, wherein the plurality of fibers are about 0.05 mm to about 75 mm long and have a diameter of between about 0.004 mm and about 15 mm.

2. The cutting tool of claim 1, wherein the hard particulate material of the matrix comprises one or more of tungsten carbide, tungsten, iron, cobalt, or molybdenum.

3. The cutting tool of claim 1, wherein the plurality of metal fibers comprises a plurality of steel fibers.

4. The cutting tool of claim 3, wherein the plurality of steel fibers comprises one of more of carbon steel, ferroalloys, cast iron, pig iron, chromoly steel, high-speed steel, stainless steel, tool steel, or alloys thereof.

5. The cutting tool of claim 4, wherein carbon steel comprises one or more of low, medium or high carbon steel or alloys thereof.

6. The cutting tool of claim 3, wherein at least one of the metal fibers has about a 0.1 mm diameter and about a 1.7 mm length.

7. The cutting tool of claim 6, wherein at least one of the metal fibers comprises medium carbon low-alloy steel.

8. The cutting tool of claim 3, wherein at least one of the metal fibers is sized between about 0.008 mm to about 10 mm in diameter and between about 0.1 mm to about 50 mm in length.

9. The cutting tool of claim 3, wherein at least one of the metal fibers comprises medium carbon low-alloy steel.

10. The cutting tool of claim 1, wherein the plurality of metal fibers comprises one or more of titanium, cobalt, nickel, manganese, chromium, or alloys thereof.

11. The cutting tool of claim 1, wherein the binder comprises one or more of copper, zinc, silver, molybdenum, nickel, cobalt, or alloys thereof.

12. The cutting tool of claim 1, wherein the cutting media are disposed homogeneously within the cutting tool.

13. The cutting tool of claim 1, wherein the plurality of cutting media comprises diamond crystals.

14. The cutting tool of claim 1, wherein the plurality of metal fibers are at least partially coated with metal, glass, ceramic, or combinations thereof.

15. The cutting tool of claim 14, wherein the plurality of metal fibers are coated to a desired thickness.

16. The cutting tool of claim 14, wherein the plurality of metal fibers are at least partially coated with one or more of titanium, cobalt, nickel, manganese, chromium, tungsten, copper, zinc, tin or alloys thereof.

17. The cutting tool of claim 1, wherein the cutting tool comprises a drill bit.

18. The cutting tool of claim 17, wherein the cutting tool comprises a core sampling drill bit.

19. The cutting tool of claim 1, wherein the hard particulate material of the matrix comprises tungsten carbide.

20. The cutting tool of claim 1, wherein the binder comprises copper alloy.

* * * * *